United States Patent
Scott (10) Patent No.: US 9,889,893 B2
(45) Date of Patent: Feb. 13, 2018

(54) SUSPENSION SYSTEM FOR A WORK VEHICLE AND RELATED SENSOR ASSEMBLY

(71) Applicant: CNH Industrial America, LLC, New Holland, PA (US)

(72) Inventor: Shane M. Scott, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/054,347

(22) Filed: Feb. 26, 2016

(65) Prior Publication Data

US 2017/0247064 A1    Aug. 31, 2017

(51) Int. Cl.
B62D 33/06    (2006.01)

(52) U.S. Cl.
CPC ................. B62D 33/0604 (2013.01)

(58) Field of Classification Search
CPC .................................................. B62D 33/0604
See application file for complete search history.

(56) References Cited

U.S. PATENT DOCUMENTS

| | | | |
|---|---|---|---|
| 3,211,485 A | 10/1965 | Petersen | |
| 3,467,421 A | 9/1969 | Bentley | |
| 3,985,385 A | 10/1976 | Kennicutt et al. | |
| 4,026,125 A | 5/1977 | Patterson | |
| 4,575,356 A | 3/1986 | Murohushi et al. | |
| 4,684,280 A | 8/1987 | Dirkin et al. | |
| 4,747,724 A | 5/1988 | Nishikawa et al. | |
| 5,141,357 A | 8/1992 | Sherman et al. | |
| 5,832,887 A | 11/1998 | Adachi et al. | |
| 5,966,936 A | 10/1999 | Pruitt | |
| 6,875,114 B2 | 4/2005 | Barron et al. | |
| 7,197,806 B2 | 4/2007 | Boudreaux et al. | |
| 7,744,149 B2 | 6/2010 | Murray et al. | |
| 8,356,858 B2 | 1/2013 | Jang | |
| 8,979,175 B2 | 3/2015 | Kim | |
| 8,998,304 B2 | 4/2015 | Oh et al. | |
| 9,140,328 B2 | 9/2015 | Lorey | |
| 2012/0205887 A1* | 8/2012 | Stander | B60G 17/019 280/124.1 |
| 2014/0225417 A1 | 8/2014 | Meinders et al. | |
| 2015/0198218 A1 | 7/2015 | Close et al. | |

* cited by examiner

*Primary Examiner* — D Glenn Dayoan
*Assistant Examiner* — Melissa A Black
(74) *Attorney, Agent, or Firm* — Rickard K. DeMille; Rebecca L. Henkel (57) ABSTRACT

A system for suspending a cab frame relative to a base component of a work vehicle may generally include a sensor assembly coupled between the cab frame and the base component. The sensor assembly may include a sensor coupled to the cab frame and a sensor arm configured to pivot relative to the sensor. The sensor assembly may also include a sensor linkage extending lengthwise between a first end portion and a second end portion. The first end portion of the sensor linkage may be coupled to the sensor arm. Additionally, the second end portion of the sensor linkage may be coupled to the base component such that the second end portion is rotatable relative to the base component about at least two different axes.

20 Claims, 6 Drawing Sheets

SUSPENSION SYSTEM FOR A WORK VEHICLE AND RELATED SENSOR ASSEMBLY

FIELD OF THE INVENTION

The present subject matter relates generally to work vehicles and, more particularly, to a suspension system for a work vehicle and a related sensor assembly configured to accommodate cab movement in multiple directions.

BACKGROUND OF THE INVENTION

A wide range of off-highway, work vehicles have been developed for various purposes. In smaller work vehicles, seats and other operator supports may be sufficient, and these may be mounted on various forms of springs and other suspension components. However, in larger or more complex works vehicles, such as certain agricultural tractors and construction equipment, a partially or fully enclosed cab is more desirable, providing one or more operators with a comfortable location from which the vehicle may be operated. Such cabs, sometimes referred to as "operator environments" also provide a central location to which controls and operator interfaces may be fed, and from which most or all of the vehicle functions may be easily controlled.

In most instances, the cab of a work vehicle is formed by a cab frame that includes a plurality of structural members coupled to one another to create a relatively stiff structural frame. The cab frame, in turn, is typically suspended relative to a fixed component of the work vehicle, such as the vehicle's chassis, via a suspension system. The suspension system is generally designed to allow movement of the cab frame relative to the chassis or other fixed component above which it is suspended. For instance, the cab frame may be allowed to rotate about two or more axes (e.g., pitch rotation and roll rotation) and may be allowed to translate linearly in three directions (e.g., forward-to-aft movement, side-to-side movement and vertical movement).

Given such freedom of the cab frame to rotate/translate, it is often desirable to monitor the position of the cab frame relative to the fixed component above which it is suspended. However, the development of a sensor or sensing device that is capable of monitoring the position of the cab frame while accommodating the various degrees of freedom that the frame is allowed to move relative to the fixed component has proven difficult.

Accordingly, a suspension system for a work vehicle and a related sensor assembly for monitoring the position of a cab frame relative to a fixed component of the work vehicle that is configured to accommodate movement of the cab frame in multiple directions would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for suspending a cab frame relative to a base component of a work vehicle. The system may generally include a support bracket coupled to the base component. The support bracket may define an opening. The opening may define a central axis extending between an insertion end and an aft end opposite the insertion end. The system may also include a sensor assembly coupled between the support bracket and the cab frame. The sensor assembly may include a sensor coupled to the cab frame and a sensor arm configured to pivot relative to the sensor. The sensor assembly may also include a sensor linkage extending lengthwise between a first end portion and a second end portion. The first end portion of the sensor linkage may be coupled to the sensor arm and the second end portion of the sensor linkage may be received within the opening. The opening may be tapered along the central axis to allow the second end portion of the sensor linkage to rotate relative to the support bracket about an axis extending non-parallel to the central axis.

In another aspect, the present subject matter is directed to a system for suspending a cab frame relative to a base component of a work vehicle. The system may generally include a sensor assembly coupled between the cab frame and the base component. The sensor assembly may include a sensor coupled to the cab frame and a sensor arm configured to pivot relative to the sensor. The sensor assembly may also include a sensor linkage extending lengthwise between a first end portion and a second end portion. The first end portion of the sensor linkage may be coupled to the sensor arm. Additionally, the second end portion of the sensor linkage may be coupled to the base component such that the second end portion is rotatable relative to the base component about at least two different axes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a suspension system for a work vehicle that allows the vehicle's cab frame to be suspended relative to a base component of the work vehicle, such as the transmission block or the vehicle chassis. Specifically, in several embodiments, the system may include a sensor assembly configured to detect changes in the position of the cab frame relative to the base component. As will be described in greater detail below, the sensor assembly may include a sensor coupled to the cab frame, a sensor arm pivotally coupled to the sensor and a sensor linkage coupled at a first end to the sensor arm and at a second end to the base component (e.g., by being coupled to a support bracket mounted directly to the base component). To allow the sensor to accurately monitor the position of the cab frame relative to the base component, the second end of the sensor linkage may be configured to be coupled to base component via a suitable means that allows the sensor linkage to move relative to the base component with three degrees of freedom. For instance, in one embodiment, a joint or coupling may be provided between the second end of the sensor linkage and a corresponding support bracket mounted to the base component to allow the second end to translate linearly relative to the bracket in a given direction and to also allow the second end to rotate relative to the bracket about two or more different axes.

In a particular embodiment of the present subject matter, the joint or coupling provided between the second end of the sensor linkage and the support bracket may be formed via a tapered opening defined in the support bracket. In such an embodiment, when the second end of the sensor linkage is received within the tapered opening, the second end may be configured to move linearly relative to the support bracket along a central axis of the opening and may also rotate relative to the support bracket about the central axis. In addition, given the tapered profile of the opening, the second end of the sensor may be configured to rotate relative to the support bracket about one or more additional axes oriented at an angle relative to the central axis. In other embodiments, the system may include any other suitable means for coupling the second end of the sensor linkage to the support bracket for allowing the second end to move relative to the bracket with three degrees of freedom, such as by using a ball and socket joint combined with a cylinder or by using a cylinder combined with revolute joints.

Figure 1:
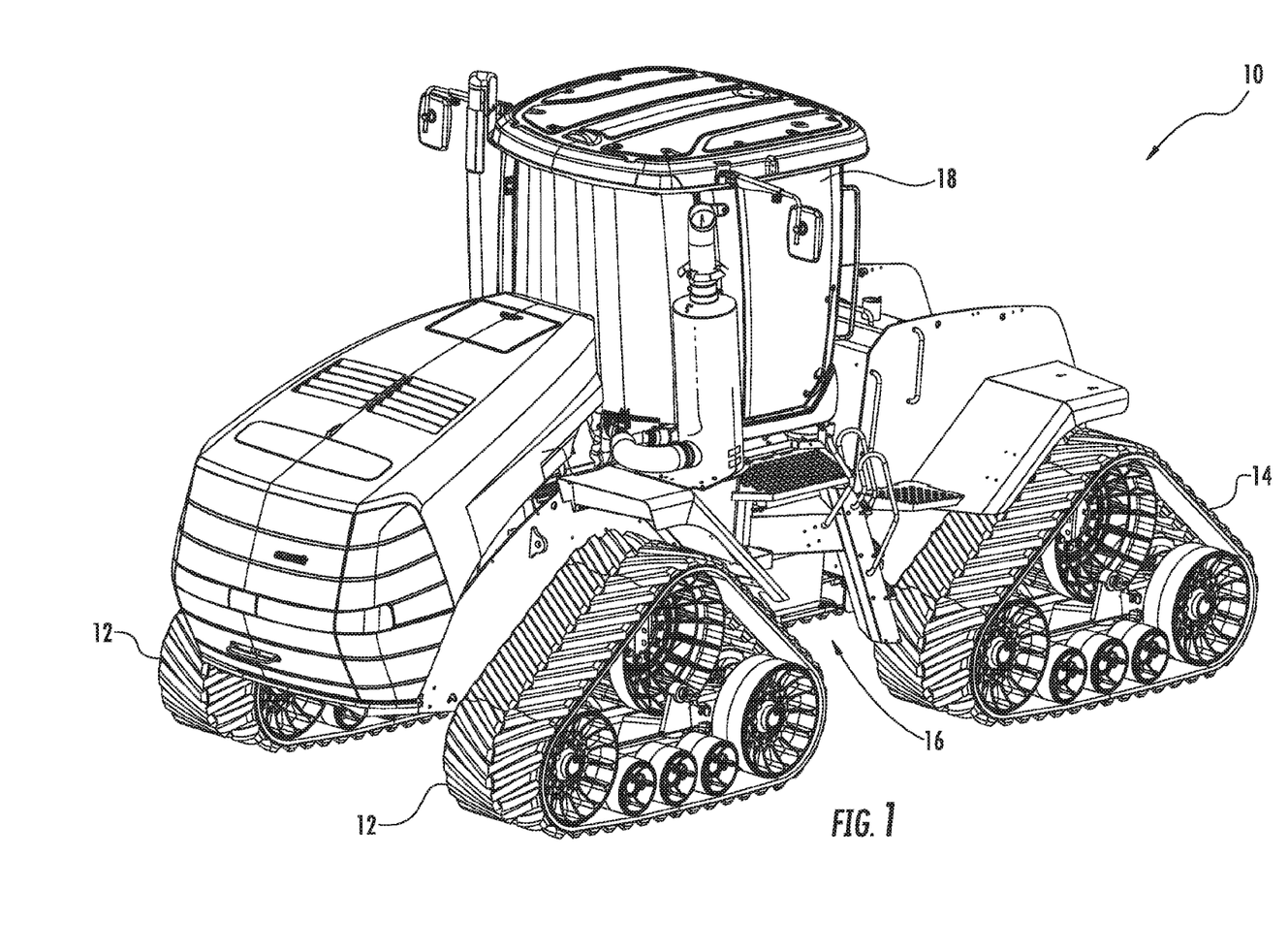
FIG. 1 illustrates a perspective view of one embodiment of a work vehicle in accordance with aspects of present subject matter.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front tracks 12, a pair or rear tracks 16 and a chassis 16 coupled to and supported by the tracks 12, 14. As is generally understood, the work vehicle 10 may also include an engine and a transmission (not shown) supported by the chassis 16, which may be used to rotationally drive the front tracks 12 and/or the rear tracks 14. Additionally, an operator's cab 18 may be supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include tires in lieu of tracks 12, 14 or may include a combination of tires and tracks.

Figure 2:
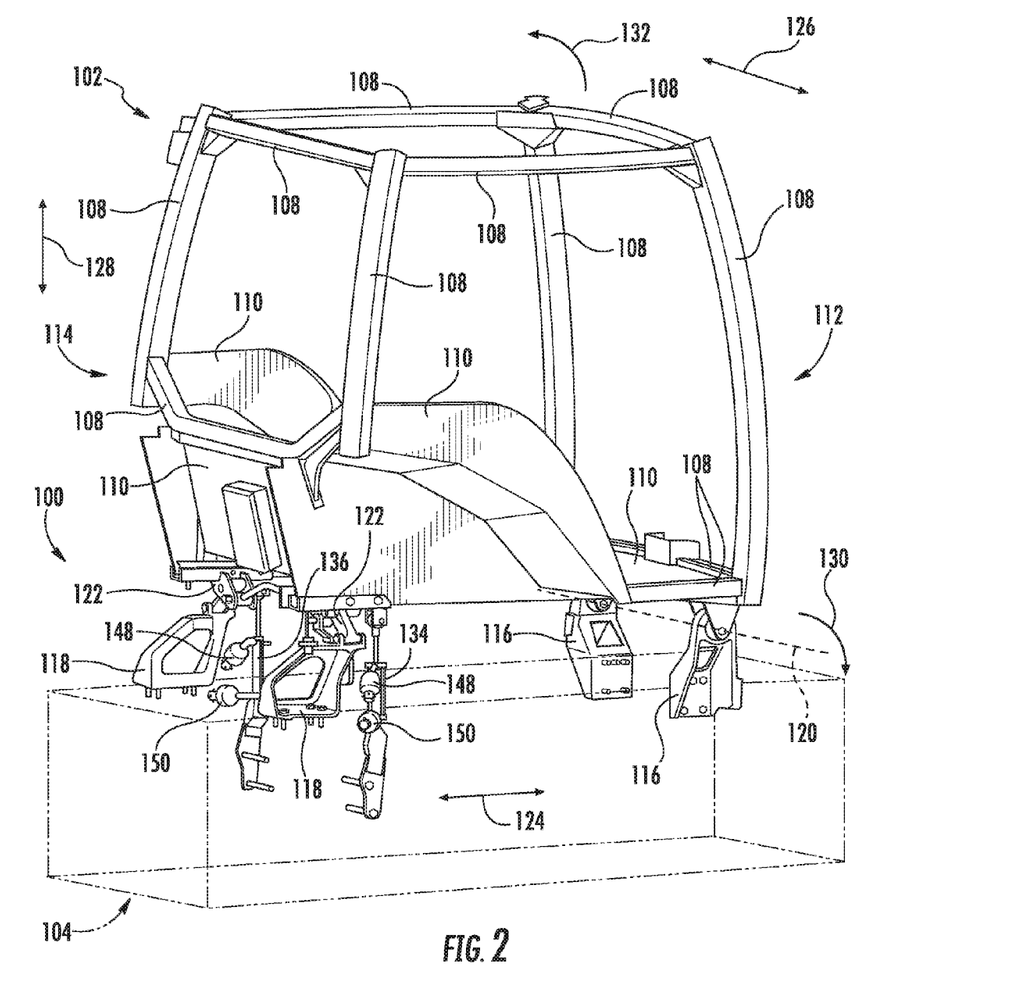
FIG. 2 illustrates a perspective view of one embodiment of a system for suspending a cab frame relative to a base component of a work vehicle in accordance with aspects of the present subject matter.
Figure 3:
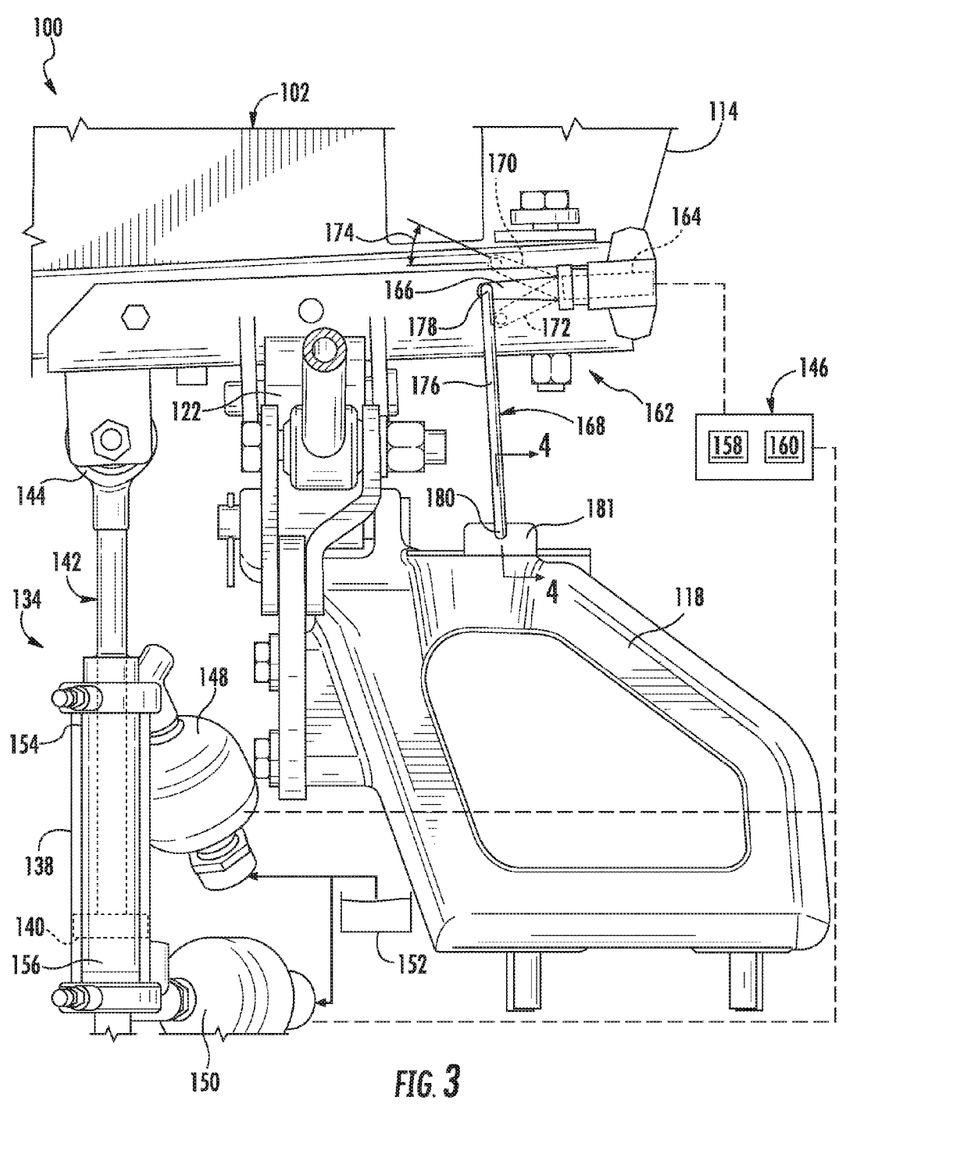
FIG. 3 illustrates a side view of a portion of the system shown in FIG. 2, particularly illustrating various components of one embodiment of a sensor assembly in accordance with aspects of the present subject matter.
Figure 4:
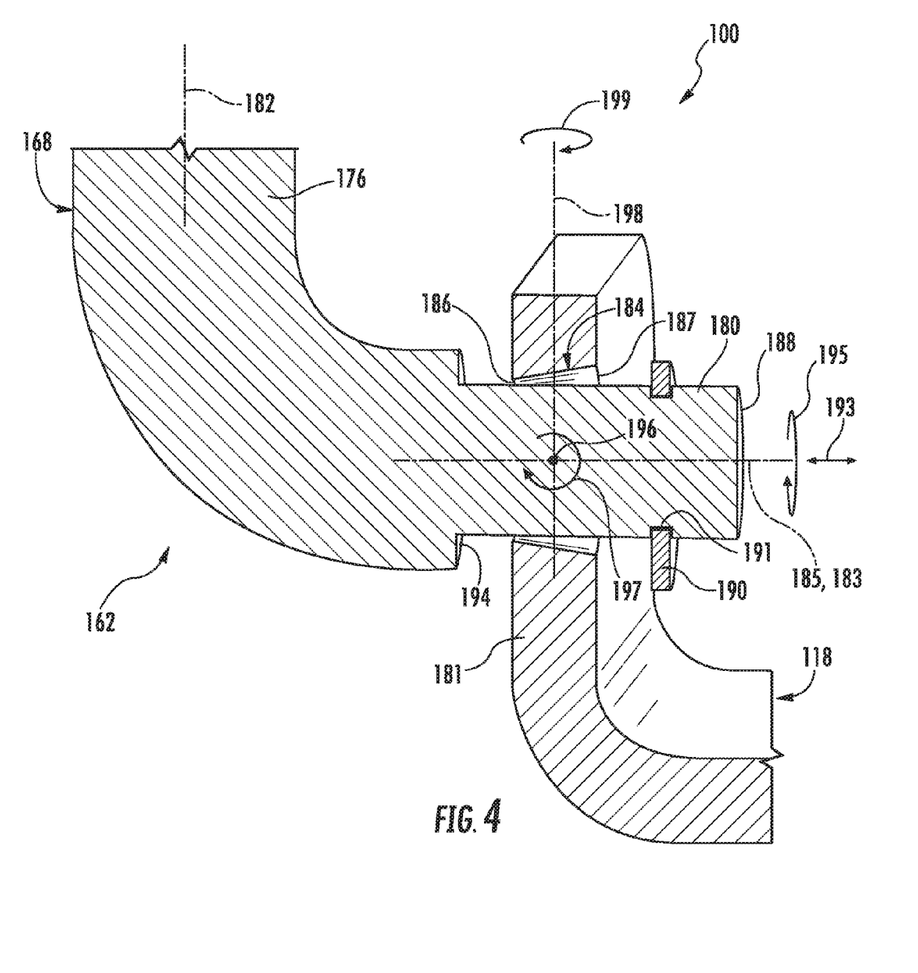
FIG. 4 illustrates a cross-sectional view of several of the system components shown in FIG. 3 taken about line 4-4, particularly illustrating an end of a sensor linkage of the sensor assembly being received within a tapered opening defined through a portion of a support bracket of the disclosed system.
Figure 5:
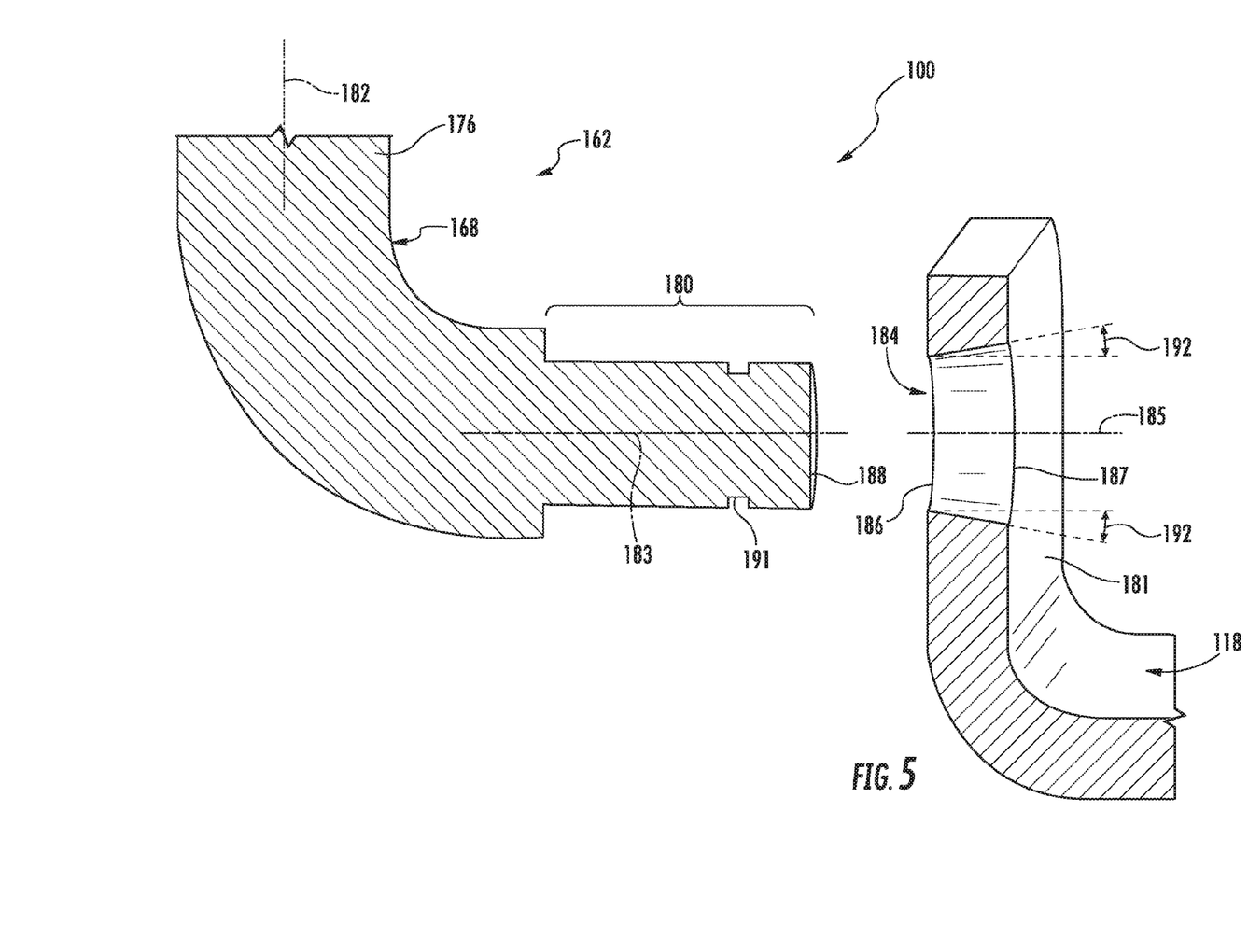
FIG. 5 illustrates another cross-sectional view of the system components shown in FIG. 4, particularly illustrating the end of the sensor linkage being exploded away from the support bracket.

Referring now to FIGS. 2-5, one embodiment of a system 100 for suspending a cab frame 102 relative to a base component 104 of a work vehicle 10 is illustrated in accordance with aspects of the present subject matter. Specifically, FIG. 2 illustrates a perspective view of the cab frame 102 suspended relative to the base component 104 using various components and/or features of the disclosed system 100. FIG. 3 illustrates a side view of a portion of the disclosed system 100 shown in FIG. 2, particularly illustrating components of a sensor assembly 162 coupled between the cab frame 102 and the base component 104. Additionally, FIG. 4 illustrates a cross-sectional view of several of the system components shown in FIG. 3 taken about line 4-4. Additionally, FIG. 5 illustrates an exploded, cross-sectional view of the system components shown in FIG. 4.

It should be appreciated that the base component 104 (shown in FIG. 2 in phantom lines) may generally correspond to any suitable frame, block and/or other component of the work vehicle 10 (including any combination of such components) above which the cab frame 102 is configured to be suspended. For example, in one embodiment, the base component 104 may correspond to the transmission block encasing the various components of the vehicle's transmission. In another embodiment, the base component 104 may correspond to a frame(s) and/or any other structural member(s) forming all or part of the vehicle's chassis.

In general, the cab frame 102 may have any suitable configuration that allows it to function as the structural frame for the operator's cab 18 (FIG. 1). Thus, in several embodiments, the cab frame 102 may include a plurality of structural members 108, 110 configured to be coupled together to form a structural frame extending lengthwise between a forward end 112 and an aft end 114. For example, as shown in FIG. 2, the cab frame 102 may include a plurality of primary structural members 108 generally configured to form the base shape or structure of the frame 102 (e.g., a generally rectangular or box shape). In addition, the cab frame 102 may include a plurality of secondary structural members 110 coupled between the primary structural members 108 to add stiffness and rigidity to the frame 102. However, in other embodiments, the cab frame 102 may have any other suitable frame-like configuration including any combination of structural members.

As shown in FIG. 2, the system 100 may include a plurality of support brackets 116, 118 configured to extend vertically between portions of the cab frame 102 and the base component 104. Specifically, the system 100 includes a pair of front brackets 116 configured to be coupled between the base component 104 and the opposed corners of the cab frame 102 located at its forward end 112. As shown in FIG. 2, in one embodiment, each of the front support brackets 116 may be coupled to the cab frame 102 via a pinned or pivotal connection to allow the cab frame 102 to rotate relative to the front support brackets 116 about a pitch axis 120. In addition, the system 100 may include a pair of rear support brackets 118 coupled between the base component 104 and the opposed corners of the cab frame 102 located at its aft end 114. As shown in FIG. 2, the rear support brackets 118 may be coupled to the cab frame 102 via suitable couplings 122 (e.g., using pivoting arms, etc.) to permit the cab frame 102 to move relative to the brackets 118 as the position and/or orientation of the cab frame 102 relative to the base component 104 is varied during operation of the work vehicle 10.

In several embodiments, the connections provided between the cab frame 102 and the front and rear support brackets 116, 118 may allow for small lateral movements of the cab frame 102 relative to the support brackets 116, 118, such as small forward-to-aft movements (indicated by arrow 124 in FIG. 2), small side-to-side movements (indicated by arrow 126 in FIG. 2) and vertical movements (indicated by arrow 128 in FIG. 2). In addition, the connections provided between the cab frame 102 and the front and rear support brackets 116, 118 may allow for rotation of the cab frame 102 relative to the brackets 116, 118, such as pitch rotation (indicated by arrow 130 in FIG. 2) about the pitch axis 120 and roll rotation (indicated by arrow 132 in FIG. 2) about an axis (not shown) extending in the forward-to-aft direction of the cab frame 102.

Moreover, as shown in FIG. 2, the system 100 may also include one or more suspension cylinders 134, 136 coupled between the cab frame 102 and the base component 104. For instance, in the illustrated embodiment, the system 100 includes first and second cylinders 134, 136 coupled to the cab frame 104 at locations generally adjacent to aft end 114 of the cab frame 102 (e.g., at locations immediately forward of the locations of the rear support brackets 118). As particularly shown in FIG. 3, each cylinder 134, 136 may generally include a cylinder housing 138 and a piston 140 disposed within the housing 138. In addition each cylinder 134, 136 may include a rod 142 extending from the piston 140 to a location exterior of the housing 138. As shown in FIG. 3, an actuating end 144 of the rod 142 may be coupled to the cab frame 102.

The suspension cylinders 134, 136 may generally provide a means for damping and/or reducing the movement of the cab frame 102 relative to the base component 104 during operation of the work vehicle. In several embodiments, the actuation of the suspension cylinders 134, 136 may be configured to be actively controlled to regulate the movement of the cab frame 102 relative to the base component 104. For example, as shown in FIG. 3, the system 100 may include a controller 146 communicatively coupled to suitable valves 148, 150 (e.g., suitable pressurize regulating valves, such as solenoid-activated valves) configured to regulate the pressure of hydraulic fluid supplied to each suspension cylinder 134, 136 (e.g., from a hydraulic fluid tank 152 (FIG. 3) of the work vehicle 10). Specifically, first and second valves 148, 150 may be provided in fluid communication with each suspension cylinder 134, 146, with each of the first valves 148 being configured to regulate the pressure of the hydraulic fluid supplied to a rod end 154 (FIG. 3) of its respective cylinder 134, 136 and each of the second valves 150 being configured to regulate the pressure of the hydraulic fluid supplied to a piston end 156 (FIG. 3) of its respective cylinder 134, 146. In such an embodiment, the controller 146 may be configured to independently regulate the actuation of each suspension cylinder 134, 136 by controlling the operation of its associated valves 148, 150. For instance, a current command supplied to each valve 148, 150 from the controller 146 may be directly proportional to the pressure supplied at the ends 154, 156 of each cylinder 134, 136, thereby allowing the controller 146 to control the displacement of the cylinders 134, 136.

It should be appreciated that the controller 146 may correspond to any suitable processor-based device known in the art, such as a computing device or any suitable combination of computing devices. Thus, in several embodiments, the controller 146 may include one or more processor(s) 158 and associated memory device(s) 160 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 160 of the controller 146 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 160 may generally be configured to store suitable computer-readable instructions that, when implemented by the processor(s) 158, configure the controller 146 to perform various computer-implemented functions, such as any methods and/or other automated functions described herein. In addition, the controller 146 may also include various other suitable components, such as a communications circuit or module, one or more input/output channels, a data/control bus and/or the like.

It should also be appreciated that the controller 146 may correspond to an existing controller of the work vehicle 10 or the controller 146 may correspond to a separate processing device. For instance, in one embodiment, the controller 146 may form all or part of a separate plug-in module that may be installed within the work vehicle 10 to allow for the disclosed system 100 to be implemented without requiring additional software to be uploaded onto existing control devices of the vehicle 10.

Referring particularly to FIGS. 3-5, the system 100 may also include a sensor assembly 162 communicatively coupled to the controller 146. In general, the sensor assembly 162 may configured to detect changes in the position of a given location on the cab frame 102 relative to the base component 104. The sensor measurements provided by the sensor assembly 162 may then be transmitted to controller 146 to allow the controller 146 to monitor the position of the cab frame 102 relative to the base component '04. Based on the monitored position, the controller 145 may the control the actuation of the suspension cylinders 134, 136 (e.g., via controlling the operation of the valves 148, 150) in a manner that dampens or reduced the overall magnitude of the relative movement between the cab frame 102 and the base component 104.

In several embodiments, the sensor assembly 162 may include a sensor 164 mounted to a portion of the cab frame 102. For instance, as shown in FIG. 3, the sensor 164 may be mounted at the aft end 114 of the cab frame 102 at a location generally adjacent to one of the rear support brackets 118. Additionally, the sensor assembly 162 may include a sensor arm 166 pivotally coupled to the sensor 164 and a sensor linkage 168 coupled between the sensor arm 166 and the adjacent support bracket 118. Given that the support bracket 118 is configured to be directly coupled to the base component 104, the combination of the sensor arm 166 and the sensor linkage 168 may generally provide a mechanical coupling between the cab frame 102 and the base component 104, thereby providing a means for detecting relative motion between such components 102, 104. For example, as shown in FIG. 3, when the cab frame 102 is displaced relative to the base component 104 such that the corner of the cab frame 102 at which the sensor assembly 162 is located moves in a direction towards the adjacent support bracket 118, the connection between the sensor linkage 168 and the sensor arm 166 may cause the sensor arm 166 to pivot upwards relative to the sensor 164 (as indicated by dashed lines 170 in FIG. 3). Similarly, when the cab frame 102 is displaced relative to the base component 104 such that the corner of the cab frame 102 moves in a direction away from the adjacent support bracket 118, the connection between the sensor linkage 168 and the sensor arm 166 may cause the sensor arm 166 to pivot downward relative to the sensor 164 (as indicated by dashed lines 172 in FIG. 3). Such movement of the sensor arm 166 may be detected by the sensor 164 and then transmitted to the controller 146 for subsequent processing and/or analysis.

It should be appreciated that the sensor 164 may generally correspond to any suitable sensor and/or sensing device configured to detect the motion of the sensor arm 166 as the cab frame 102 moves relative to the base component 104. For instance, in one embodiment, the sensor 164 may correspond to an angle sensor configured to detect a pivot angle 174 of the sensor arm 166 relative to a given reference (e.g., a horizontal reference plane). In such an embodiment, the pivot angle measurements provided by the sensor 165 may be used by the controller 146 to determine the direction and/or magnitude of the linear translation and/or rotation of the cab frame 102 relative to the base component 104.

As shown in FIG. 3, the sensor linkage 168 may generally correspond to an elongated rod having a central portion 176 extending lengthwise between a first end portion 178 and a second end portion 180. The first end portion 178 may be configured to be coupled to the sensor arm 166, such as by inserting the first end portion 178 through an opening (not shown) defined in the sensor arm 166. Additionally, the second end portion 180 may be configured to be coupled to a portion of the adjacent support bracket 118. For instance, as shown in FIG. 2, the second end portion 180 may be coupled to a mounting flange 181 of the support bracket 118.

It should be appreciated that, in one embodiment, the end portions 178, 180 of the sensor linkage 168 may be configured to extend outwardly from the central portion 176 at an angle relative to a longitudinal axis 182 of the linkage 168. For instance, as shown in FIG. 5, the second end portion 180 may generally extend lengthwise along an axis 183 that is oriented perpendicular to the longitudinal axis 182 of the sensor linkage 168.

As indicated above, when coupling the sensor linkage 168 to the support bracket 118, it is desirable to allow the linkage 168 to have three degrees of freedom relative to the bracket 118, such as by allowing the linkage 168 to rotate relative to the bracket 118 about two or more different axes and/or by allowing the linkage 168 to linearly translate relative to the bracket 118. Thus, in accordance with aspects of the present subject matter, the system 100 may include suitable means for means for coupling the second end portion 180 of the sensor linkage 168 to the support bracket 118 so as to allow the second end portion 180 to move relative to the support bracket 118 with three degrees of freedom.

For example, in one embodiment, a tapered opening 184 may be defined through the mounting flange 181 of the support bracket 118 for receiving the second end portion 180 of the sensor linkage 168. Specifically, as shown in FIGS. 4 and 5, the opening 184 may extend lengthwise along a central axis 185 between an insertion end 186 and an aft end 187. In such an embodiment, the second end portion 180 of the sensor linkage 168 may be configured to be installed within the opening 184 by inserting a tip end 188 of the second end portion 180 through the insertion end 186 of the opening 184 and by moving the second end portion 180 laterally relative to the support bracket 118 along the central axis 185 until the tip end 188 extends outwardly from the aft end 187 of the opening 184. Thereafter, as particularly shown in FIG. 4, a C-clip or other suitable retention device 190 may be coupled to the second end portion 180 at a location between the tip end 188 and the aft end 197 of the opening 184 (e.g., within a groove 191 defined in the second end portion 180) to prevent the second end portion 180 from backing out of the opening 184.

Additionally, as shown in FIG. 5, the opening 184 may be configured to taper outwardly as the opening extends lengthwise along its central axis 185 from the insertion end 186 to the aft end 187 so as to define a diverging circumferential profile. As such, a diameter of the opening 184 at its insertion end 186 may be smaller than a diameter of the opening 184 at its aft end 187. It should be appreciated that the opening 184 may be configured to diverge outwardly along its central axis 185 at any suitable taper angle 192. However, in a particular embodiment of the present subject matter, the taper angle 192 may generally range from about 1 degree to about 20 degrees, such as from about 2 degrees to about 15 degrees or from about 3 degrees to about 10 degrees and any other subranges therebetween.

By coupling the second end portion 180 of the sensor linkage 168 to the support bracket 118 via the tapered opening 184, the second end portion 180 may be allowed to move relative to the bracket 118 with three degrees of freedom. For example, the second end portion 180 may linearly translate relative to the support bracket 118 along the central axis 185 of the opening 184 (as indicated by arrow 193 in FIG. 4) between the retention device 190 and a flange 194 of the sensor linkage 168. In addition, the second end portion 180 may rotate (as indicated by arrow 195 in FIG. 4) relative to the support bracket 118 about the central axis 185 of the opening 184. Moreover, given the tapered profile of the opening 184, the second end portion 180 may also be allowed to rotate relative to the support bracket 118 about one or more additional axes. For instance, as shown in FIG. 4, the second end portion 180 may rotate relative (as indicated by arrow 197 in FIG. 4) to the support bracket 118 about a horizontal axis (indicated by point 196) extending perpendicular to the central axis 185 (e.g., an axis extending into the page along a horizontal plane) such that the tip end 188 of the second end portion 180 is displaced up/down relative to the view shown in FIG. 4. Additionally, as shown in FIG. 4, the second end portion 180 may rotate (as indicated by arrow 199 in FIG. 4) relative to the support bracket 118 about a vertical axis 198 extending perpendicular to the central axis 185 (e.g., parallel to the longitudinal axis 182 of the linkage 168) such that the tip end 188 of the second end portion 180 is displaced into/out of the page relative to the view shown in FIG. 4. Accordingly, the second end portion 180 may linearly translate and/or rotate relative to the support bracket 118 to accommodate the movement of the cab frame 102 in various different directions.

Figure 6:
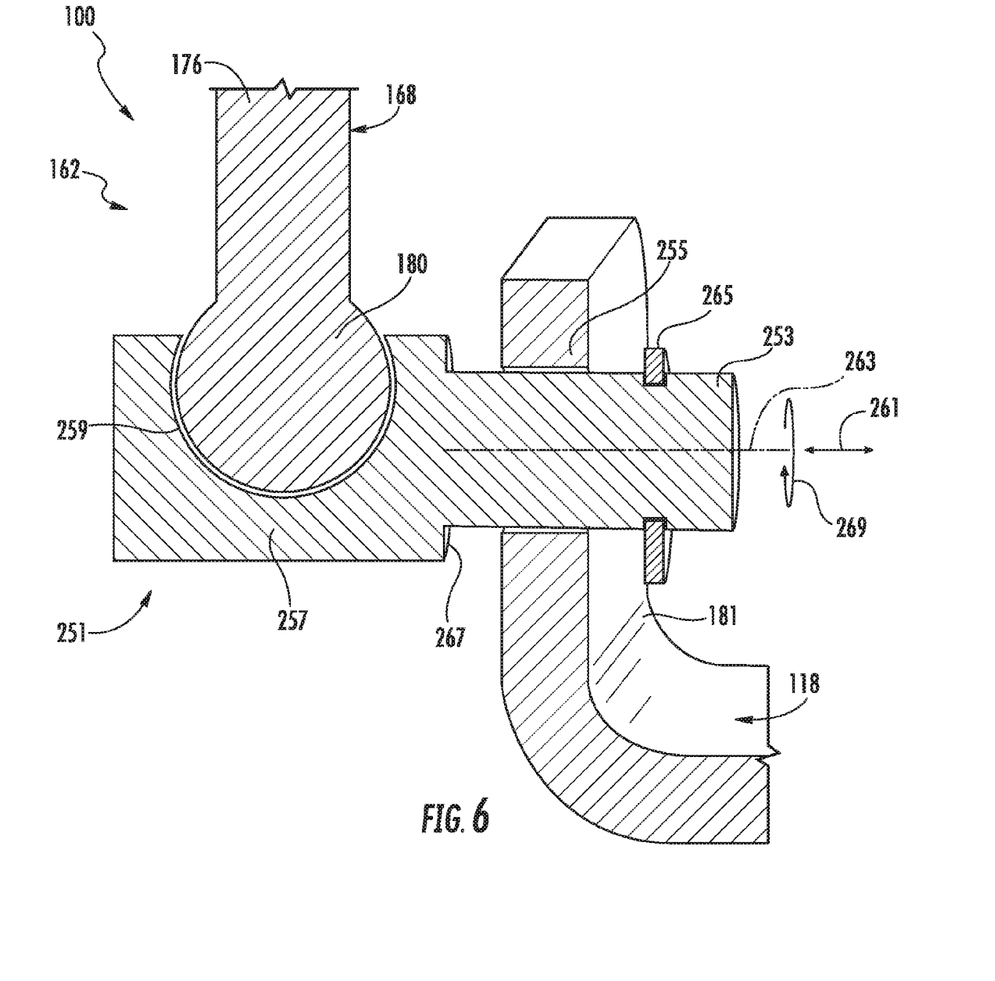
FIG. 6 illustrates a cross-sectional view of another embodiment of a means for coupling the sensor linkage to the support bracket of the disclosed system in accordance with aspects of the present subject matter.

It should be appreciated that, in alternative embodiments, any other suitable means may be utilized to couple the second end portion 180 of the sensor linkage 168 to the support bracket 118 in a manner that allows the second end portion 180 to move relative to the support bracket 118 with three degrees of freedom. For instance, FIG. 6 illustrates a cross-sectional view of an alternative embodiment for coupling the second end portion 180 of the sensor linkage 168 to the support bracket 118. As shown, as opposed to coupling the sensor linkage 168 directly to the support bracket 118, a separate coupling member 251 may be coupled between the sensor linkage 168 and the bracket 118. In the illustrated embodiment, the coupling member 251 includes a cylindrical portion 253 configured to be received within an opening 255 defined in the support bracket 118 (e.g., by defining the opening 255 in the mounting flange 181) and a socket portion 257 defining a socket 259 configured to receive the second end portion 180 of the linkage 168. In such an embodiment, the second end portion 180 of the linkage 168 may have a ball-like configuration, thereby creating a ball and socket joint between the coupling member 251 and the sensor linkage 168.

As shown in FIG. 6, by using the coupling member 251, the second end portion 180 may be allowed to linearly translate relative to the support bracket 118 (as indicated by arrow 261 in FIG. 6) in a direction extending parallel to a central axis 263 of the opening 255 (e.g., between a retention device 265 and an opposed flange 267) due to the cylinder joint created between the cylindrical portion 253 and the mounting flange 181. The second end portion 180 may also be allowed to rotate relative to the support bracket 118 (as indicated by arrow 269 in FIG. 6) about the central axis 263 of the opening 255. Additionally, given the ball and socket joint created between the coupling member 251 and the sensor linkage 168, the second end portion 180 may also be allowed to rotate relative the support bracket 118 about various additional axes extending non-parallel to the central axis 263 of the opening 255.

It should be appreciated that, in even further embodiments, the second end portion 180 of the sensor linkage 168 may be coupled to the support bracket 118 using any other suitable means that provides for such relative movement of the sensor linkage 168, such as by using a cylinder in combination with revolute joints.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for suspending a cab frame relative to a base component of a work vehicle, the system comprising:
 a support bracket coupled to the base component, the support bracket defining an opening, the opening defining a central axis extending between an insertion end and an aft end opposite the insertion end; and
 a sensor assembly coupled between the support bracket and the cab frame, the sensor assembly including a sensor coupled to the cab frame and a sensor arm configured to pivot relative to the sensor, the sensor assembly further comprising a sensor linkage extending lengthwise between a first end portion and a second end portion, the first end portion of the sensor linkage being coupled to the sensor arm and the second end portion of the sensor linkage being received within the opening,
 wherein the opening is tapered along the central axis to allow the second end portion of the sensor linkage to rotate relative to the support bracket about an axis extending non-parallel to the central axis.

2. The system of claim 1, wherein the second end portion of the sensor linkage is received within the opening such that the second end portion is configured to translate laterally relative to the support bracket along the central axis.

3. The system of claim 1, wherein the second end portion of the sensor linkage is received within the opening such that the second end portion is configured to rotate relative to the support bracket about the central axis.

4. The system of claim 1, wherein the opening is tapered along the central axis at a taper angle ranging from about 1 degree to about 20 degrees.

5. The system of claim 1, wherein the opening is tapered outwardly along the central axis from the insertion end to the aft end.

6. The system of claim 1, wherein the opening is defined in a mounting flange of the support bracket.

7. The system of claim 1, wherein the axis corresponds to a horizontal axis extending perpendicular to the central axis.

8. The system of claim 1, wherein the axis corresponds to a vertical axis extending perpendicular to the central axis.

9. The system of claim 1, wherein the sensor arm is configured to pivot relative to the sensor due to relative movement between the cab frame and the base component.

10. The system of claim 9, wherein the sensor is configured to monitor a pivot angle of the sensor arm as the sensor arm pivots relative to the sensor.

11. The system of claim 1, further comprising:
 a suspension cylinder coupled to the cab frame; and
 a controller communicatively coupled to the sensor, the controller being configured to control an actuation of the suspension cylinder based on sensor measurements received from the sensor.

12. The system of claim 11, further comprising a valve provided in fluid communication with the suspension cylinder, the controller being configured to control the operation of the valve so as to regulate a supply of fluid to the suspension cylinder.

13. A system for suspending a cab frame relative to a base component of a work vehicle, the system comprising:
 a sensor assembly coupled between the cab frame and the base component, the sensor assembly including a sensor coupled to the cab frame and a sensor arm configured to pivot relative to the sensor, the sensor assembly further comprising a sensor linkage extending lengthwise between a first end portion and a second end portion, the first end portion of the sensor linkage being coupled to the sensor arm; and
 means for coupling the second end portion of the sensor linkage to the base component to allow the second end portion to rotate relative to the base component about at least two different axes.

14. The system of claim 13, wherein the means comprises a tapered opening defined in a support bracket coupled to the base component, the second end portion of the sensor linkage being received within the tapered opening.

15. The system of claim 14, wherein the tapered opening defines a central axis, the second end portion being configured to rotate relative to the support bracket about the central axis and an additional axis extending non-parallel to the central axis.

16. The system of claim 15, wherein the second end portion of the sensor linkage is received within the tapered opening such that the second end portion is further configured to translate laterally relative to the support bracket along the central axis.

17. The system of claim 13, wherein the means comprises a coupling member coupled between the second end portion of the sensor linkage and a support bracket coupled to the base component, the coupling member including a socket portion configured to receive the second end portion and a cylindrical portion configured to be received within an opening defined in the support bracket.

18. The system of claim 13, wherein the sensor is configured to monitor a pivot angle of the sensor arm as the sensor arm pivots relative to the sensor.

19. The system of claim 13, further comprising:
a suspension cylinder coupled to the cab frame; and
a controller communicatively coupled to the sensor, the controller being configured to control an actuation of the suspension cylinder based on sensor measurements received from the sensor.

20. The system of claim 19, further comprising a valve provided in fluid communication with the suspension cylinder, the controller being configured to control the operation of the valve so as to regulate a supply of fluid to the suspension cylinder.

* * * * *